(12) United States Patent (10) Patent No.: US 12,596,634 B2
Ryszka et al. (45) Date of Patent: Apr. 7, 2026

(54) TESTING A MACHINE LEARNING MODEL

(71) Applicant: INTERNATIONAL BUSINESS MACHINES CORPORATION, Armonk, NY (US)

(72) Inventors: Daniel Jakub Ryszka, Cracow (PL); Lukasz G. Cmielowski, Cracow (PL); Jan Soltysik, Cracow (PL); Szymon Kucharczyk, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 18/187,069

(22) Filed: Mar. 21, 2023

(65) Prior Publication Data

US 2024/0256432 A1 Aug. 1, 2024

(30) Foreign Application Priority Data

Jan. 26, 2023 (GB) ...................................... 2301107

(51) Int. Cl.
*G06F 11/3668* (2025.01)

(52) U.S. Cl.
CPC ...... *G06F 11/3684* (2013.01); *G06F 11/3676* (2013.01); *G06F 11/3688* (2013.01)

(58) Field of Classification Search
CPC ............. G06F 11/3684; G06F 11/3676; G06F 11/3688; G06N 20/00
See application file for complete search history.

(56) References Cited

U.S. PATENT DOCUMENTS

| | | | | |
|---|---|---|---|---|
| 2021/0248464 A1* | 8/2021 | Heinzemann | ....... | G06F 11/3684 |
| 2021/0357508 A1 | 11/2021 | Elovici | | |
| 2022/0129613 A1* | 4/2022 | Jindal | ................... | G06F 30/392 |
| 2023/0153654 A1* | 5/2023 | Parker | ................... | G06N 20/20 |
| | | | | 706/12 |

FOREIGN PATENT DOCUMENTS

| | | |
|---|---|---|
| CN | 103246603 B | 8/2016 |

OTHER PUBLICATIONS

Achimugu, et al., "An Improved Approach for Generating Test Cases during Model-Based Testing Using Tree Traversal Algorithm." Published in 2021. 9 pages. In Journal of Software Engineering and Applications, 2021, 14, 257-265. DOI: 10.4236/jsea.2021.146015.

(Continued)

*Primary Examiner* — Duy Khuong T Nguyen
(74) *Attorney, Agent, or Firm* — Daniel M. Yeates

(57) ABSTRACT

A method for generating tests of a machine learning (ML) engine includes determining a feature space of the set of configuration parameters of at least part of initial test cases of the ML engine. One or more areas of low coverage may be identified in the feature space. A configuration of a new test case may be defined such that the new test case covers a low coverage area of the feature space. The new test case may be provided for testing a performance of the ML engine to find a ML model using an input dataset according to the configuration of the new test case.

20 Claims, 7 Drawing Sheets

(56)                    References Cited

OTHER PUBLICATIONS

Aggarwal, et al., "Black box fairness testing of machine learning models." Published Aug. 12, 2019. 11 pages. ESEC/FSe 2019: Proceedings of the 2019 27th ACM Joint Meeting on European Software Engineering Conference and Symposium on the Foundations of Software Engineering. pp. 625-635. https://doi.org/10.1145/3338906.3338937.

Briand, et al., "Using Machine Learning to Refine Black-Box Test Specifications and Test Suites." 10 pages. https://www.google.com/url?sa=t&rct=j&q=&esrc=s&source=web&cd=&cad=rja&uact=8&ved=2ahUKEwi9v-PCkNL1AhXyllsKHRW0B84QFnoECC8QAQ&url=https%3A%2F%2Fwww.simula.no%2Ffile%2Fsimulase251pdf%2Fdownload&usg=AOvVaw1cGPRStP8qgxFnTaEwtNYU.

Brunetto, et al., "On Introducing Automatic Test Case Generation in Practice: A Success Story and Lessons Learned." Published Feb. 28, 2021 by ARXIV. 38 pages. https://arxiv.org/abs/2103.00465.

Kejriwal, N., "Automatic Test Case Generation Using Machine Learning." Last updated Sep. 5, 2022 by Sofy. 4 pages. https://sofy.ai/blog/automatic-test-case-generation-using-machine-learning/.

Pei, et al., "DeepXplore: Automated Whitebox Testing of Deep Learning Systems." Published Oct. 14, 2017. 18 pages. SOSP '17: Proceedings of the 26th Symposium on Operating Systems Principles. pp. 1-18. https://doi.org/10.1145/3132747.3132785.

Ribeiro, et al., "Beyond Accuracy: Behavioral Testing of NLP Models with CheckList." 11 pages. https://homes.cs.washington.edu/~marcotcr/acl20_checklist.pdf.

Saes, L., "Unit test generation using machine learning." Published Aug. 18, 2018. 64 pages. https://research.infosupport.com/wp-content/uploads/Unit-test-generation-using-machine-Master-Thesis-Laurence-Saes.pdf.

Wu, et al., "Errudite: Scalable, Reproducible, and Testable Error Analysis." Published Jul. 28, 2019. 17 pages. In Proceedings of the 57th Annual Meeting of the Association for Computational Linguistics, pp. 747-763. https://aclanthology.org/P19-1073.pdf.

Zvornicanin, E., "Automated Testing in Machine Learning Projects." Published Jan. 24, 2023. 12 pages. Published by Neptune.AI. https://neptune.ai/blog/automated-testing-machine-learning.

Santiago, Dionny. "A Model-Based AI-Driven Test Generation System", FIU Digital Commons, Nov. 9, 2018, 83 pages, https://digitalcommons.fiu.edu/cgi/viewcontent.cgi?article=5192&context=etd.

* cited by examiner

```
{
    "id": 42,
    "source": {
        "type": "type-1",
    "uri": "type-1://location-1/ex-org/ex-project/issues/123"

},
    "dataset": {
        "location": {
            "type": "s3",
        "uri": "s3://some-location/some-bucket/dataset.csv"

},
        "specs": {
            "size": 43008,
            "rows": 420,
        "problem_type": "classification",
            "features": {
                "total": 13,
                "boolean": 1,
                "numeric": 6,
                "string": 5,
                "text": 1

}
        "feature_stats": {
                "max_unique": 175,
                "mean_unique": 24,
                "longest_string": 42,
                "longest_text": 531

}
        }
    },
    "test": {
    "scenario_ids": [21, 64],
    "case_ids": ["21-3", "64-3", "64-4"],
    "error_type": "TimeoutError"
    }
}
```

FIG. 5

TESTING A MACHINE LEARNING MODEL

BACKGROUND

The present invention relates to the field of digital computer systems, and more specifically, to a method for generating tests of a machine learning engine.

Machine learning models are being integrated in many software systems such as database transaction processing systems. These models may be very complex to evaluate. For example, the evaluation and monitoring of such models rely on the behaviour of the outcomes as function of the inputs. However, such evaluations may be resource consuming.

SUMMARY

Various embodiments provide a method for generating tests of a machine learning engine, computer program product and system as described by the subject matter of the independent claims. Advantageous embodiments are described in the dependent claims. Embodiments of the present invention can be freely combined with each other if they are not mutually exclusive.

In one aspect, the invention relates to a method for generating tests of a machine learning (ML) engine, the ML engine being configured for automatically finding a ML Model for performing a machine learning task based on an input dataset, wherein initial test cases are provided for testing the ML engine, wherein each test case has a specific configuration for testing the ML engine for performing a specific machine learning task, wherein the configuration is defined by a set of configuration parameters, the set of configuration parameters comprising at least part of a set of characteristics of the input dataset and/or at least part of a set of machine learning parameters. The method comprises: determining a feature space of the set of configuration parameters of at least part of the initial test cases, the feature space having a dimension equal to the number of configuration parameters; identifying one or more areas of low coverage in the feature space; defining a configuration of a new test case such that the new test case covers a low coverage area of the feature space; and providing the new test case for testing a performance of the ML engine to find a ML model using an input dataset according to the configuration of the new test case.

In one aspect the invention relates to a computer program product comprising a computer-readable storage medium having computer-readable program code embodied therewith, the computer-readable program code configured to implement the method of the above embodiment.

In one aspect the invention relates to a computer system for generating tests of a machine learning (ML) engine; the ML engine being configured for automatically finding a ML Model for performing a machine learning task based on an input dataset; wherein initial test cases are provided for testing the ML engine; wherein each test case has a specific configuration for testing the ML engine for performing a specific machine learning task, wherein the configuration is defined by a set of configuration parameters, the set of configuration parameters comprising at least art of a set of characteristics of the input dataset and/or at least part of a set of machine learning parameters; the computer system is configured for:

determining a feature space of the set of configuration parameters of at least part of the initial test cases, the feature space having a dimension equal to the number of configuration parameters;

identifying one or more areas of low coverage in the feature space;

defining a configuration of a new test case such that the new test case covers a low coverage area of the feature space;

providing the new test case for testing a performance of the ML engine to find a ML model using an input dataset according to the configuration of the new test case.

BRIEF DESCRIPTION OF THE DRAWINGS

In the following embodiments of the invention are explained in greater detail, by way of example only, making reference to the drawings in which:

FIG. 5 shows an example issue document in accordance with an example of the present subject matter.

DETAILED DESCRIPTION

Figure 1:
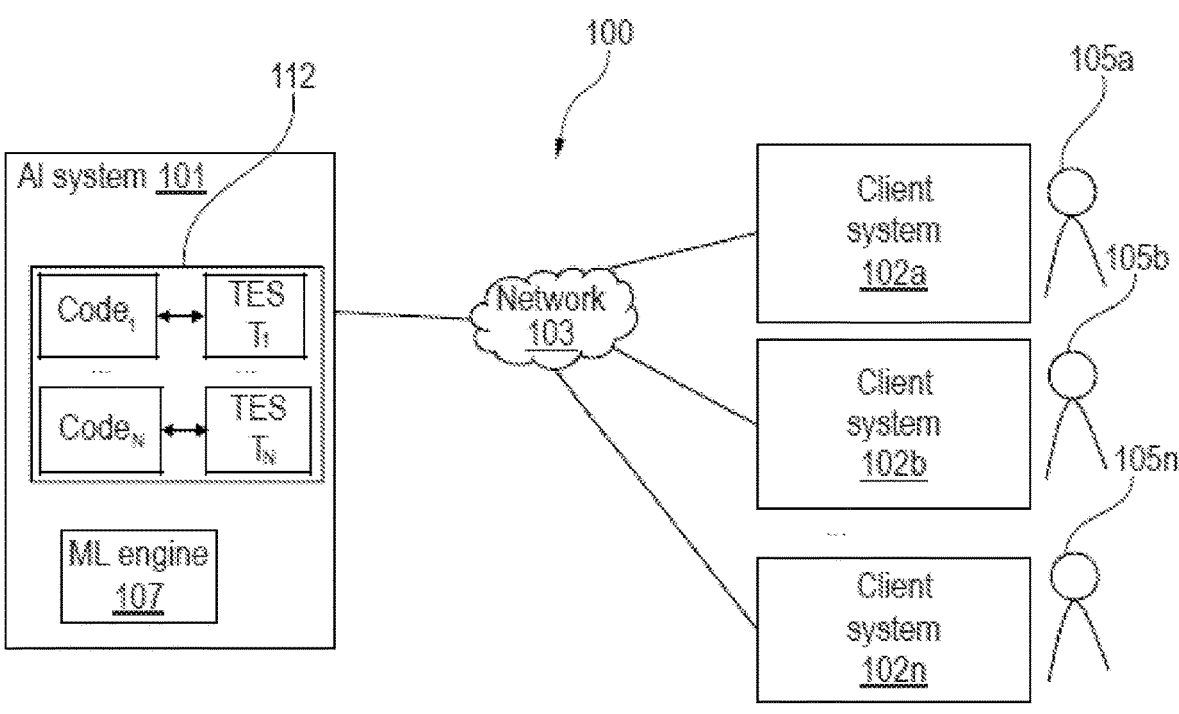
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The machine learning engine (ML engine) may be configured to generate a trained machine learning model for a specific machine learning task. The ML engine may for example, be an AutoML or AutoAI. AI stands for artificial intelligence. The ML engine may comprise at least an input data control component and a ML model control component. The input data control component may be configured for performing at least one of the data processing or feature engineering of input datasets. The ML model control component may be configured to perform at least one of ML model selection or hyperparameter optimization in order to train and find one or more trained models that can be used to perform a machine learning task. The machine learning task may for example, comprise a binary classification, a multiclass classification, a regression, a clustering or an anomaly detection.

The ML engine may be configured to receive an input dataset, select one or more ML models and provide one or more trained ML models of the selected models for performing a machine learning task. The input dataset may have a set of characteristics. The selected one or more ML models may have a set of machine learning parameters. The machine learning parameters may for example, comprise initial weights, learning rate, momentum etc.

The ML engine may be tested using an initial set of test cases. For example, a test case may be implemented by a test code comprising instructions that when executed may enable to test the ML engine. The test code may select datasets that have the set of characteristics and may perform the training of the ML models using specific values of the set of ML parameters.

The test of the ML engine may comprise providing an input comprising a dataset and a machine learning task. The ML engine may be executed using the input in order to suggest or provide one or more trained ML models that are suitable for that ML task. One or more metrics (or performance index) may be evaluated or monitored during execution of the ML engine. These metrics may enable to test the ML engine. The metric may for example, comprise the accuracy for the classification tasks, mean squared error for regression tasks, the processing time of the ML engine or the robustness of the ML engine. The robustness indicates whether the ML engine provides similar results across multiple runs of the same input dataset.

Each test case of the set of test cases has a specific configuration. The configuration may be defined by a set of configuration parameters. The input datasets may be described by a set of characteristics. The selection and training of the ML models by the ML engine may be described by a set of experiment parameters. The set of configuration parameters may comprise at least part of the set of characteristics and/or at least part of the set of experiment parameters. For example, the set of configuration parameters are the set of characteristics of the input dataset and/or the set of experiment parameters. The set of experiment parameters may for example, be the set of machine learning parameters of the ML models being used by the ML engine. The dataset comprises records, wherein each record of the records comprises values of a set of features.

In one example, a subset of one or more test cases of the initial set of test cases may be used to define a feature space. The feature space may for example, be a n-dimensional space, whose dimension is equal to the total number of configuration parameters in the set of configuration parameters. The feature space may comprise points representing the subset of test cases respectively. Each point in the feature space may be a n-dimensional vector having values of the set of configuration parameters respectively.

The feature space may be divided into multiple areas. For example, the areas may be of similar or equal sizes. The divided feature space may have one or more areas of low coverage. Alternatively, the feature space may be processed to identify low coverage areas in the feature space. The coverage of an area is low if the coverage of the area is below a predefined threshold. The threshold may for example, be a minimum number of points. Alternatively, the threshold may for example, be the average number of points in all areas of the feature space. A low coverage area may for example, be due to the fact that some dataset characteristics are not covered and/or some values of the ML parameters are not covered by the subset of the test cases which define the feature space.

The present subject matter may make use of the feature space to define new test cases that provide reliable and non-redundant tests. This may enable to provide accurate ML models for different ML tasks. The new test case may have a configuration defined by a new input dataset that has a set of characteristics that fill the low coverage areas and/or new uncovered values of the set of ML parameters of the ML engine. For example, a point X may be determined in a selected low coverage area of the feature space. This determined point X is associated with a n-dimensional vector of values of the set of configuration parameters which define the new test case. That is, the new test case may have to have an input dataset that has a set of characteristics of that point X and a set of ML parameters of that point X.

Tests generation in manual manner may be time consuming, exhausting and prone to errors, when covering wide range of data sets. The present subject matter may solve this issue by automatically covering multiple test scenarios for different data sets, learning types etc.

According to one example, the feature space is defined by the sets of characteristics of the input datasets of the subset of the test cases and/or the set of machine learning parameters of the subset of the test cases. For example, each test case of the subset of test cases may be represented by a point in the feature space. This point represents the values of the set of characteristics of the input dataset and the set of ML parameters associated with the test case. The feature space may be divided in a number of equal areas or quasi equal areas. The coverage of each area of the feature space may be the number of points in the area. The low coverage area may be an area having a number of point smaller than a minimum number of points. A new test case may be defined such that its associated point in the feature space is part of one low coverage area of the feature space.

According to one example, the method further comprises: providing a bug tracking system that is configured to identify bugs when testing the ML engine using the initial test cases and collect bug data descriptive of the bugs. The bug data may be processed for identifying one or more test cases, referred to as bug test cases, wherein the subset of the initial test cases used to determine the feature space are the bug test cases. That is, the feature space is built using the bug test cases only. This may be advantageous as there may be a need to replace these bug test cases by new test cases or add to these bug test cases new test cases. This example may enable to generate, analyse and improve test scenarios based on the history of the issues/bugs related to the datasets used for model creation using automatic AI systems.

According to one example, the bug data further indicates values of a problematic feature and/or a problematic machine learning parameter, wherein the configuration of the new test case is defined further using the problematic values. For example, if there are multiple low coverage areas in the feature space, the low coverage area to be covered by the new test case should not comprise the problematic values. This example may further improve performance of test cases as it may enable to cover reliable test cases.

According to one example, the bug data of a test case (Tx) indicates any one of: an erroneous value of a performance metric for the performed machine learning task of the test case Tx, wherein the performance metric comprises: an accuracy for a classification task performed by the test case Tx, a mean-squared error for a regression task of the test case Tx, an exceeded processing time limit of the testing of the ML engine using the test case Tx, or different results using multiple runs of the same input dataset of the test case Tx.

According to one example, the subset of test cases used to build the feature space are all the initial set of test cases or one selected test case of the set of test cases. The selected test case may be a randomly selected test case. Using all provided initial test cases to build the feature space may be advantageous as it may enable to find new test cases which are different from and complementary to the provided tests cases. Using only one test case for defining the feature space may be advantageous in case of an iterative process where the test cases are determined one after the other. It may also be advantageous to use one test case to build the feature space in case the provided initial test cases are similar e.g., they differ only by the values stored in the datasets.

According to one example, the set of characteristics of the dataset comprise at least one of: the fraction of categorical features in the dataset, the number of features in the dataset, the number of numerical features in the dataset, the number of records in the dataset, or the proportion of records with at least one missing feature. The categorical feature may have one of a limited e.g., fixed, number of possible values. The categorical features may for example, be non-numerical features.

According to one example, the feature space is defined as a correlation matrix of a subset of characteristics of the input datasets of the subset of test cases. That is, the set of configuration parameters of the ML engine may depend on the dataset only, as they comprise only said subset of characteristics. This may enable to generate tests cases using fixed ML parameters of the ML engine.

According to one example, the feature space is a two-dimensional (2D) space that is defined as a correlation matrix of the number of categorical features and the number of numerical features in each dataset of the subset of test cases. That is, the set of configuration parameters that are used to define the configuration of the subset of test cases are the number of categorical features and the number of numerical features in the input datasets.

According to one example, the new test case is defined using the provided initial set of test cases. For example, the code of an initial test case may be modified such that the set of configuration parameters of the new test case replace the set of configuration parameters of that initial test case. This may result in a new code for the new test case.

According to one example, the method further comprises computing a performance index of the new test case, and saving the new test case with the initial set of test cases in case the performance index fulfils a predefined performance condition. This may enable a controlled and reliable production of test cases.

The feature space may for example, be rebuilt using the subset of test cases in addition to the generated new test case. According to one example, the performance index is determined using at least one of: execution time of the new test case, features coverage of the (rebuilt) feature space including the new test case, number of found bugs with test cases of the feature space, or number of missed bugs with test cases of the feature space. The performance condition may for example, require that the execution time is smaller than a maximum execution time. The performance condition may be defined to provide a synergy with the bug-based defined feature space because it constrains the bugs used to define the feature space.

The feature space may for example, be normalized such that values in each dimension are between 0 and 1. According to one example, determining the feature space comprises: projecting all data to a k-D feature space, where k is the number of configuration parameters, dividing the space into multiple areas, constructing a histogram, where each area is represented by a histogram bar with height equal to number of points (or datapoints) in the normalized feature space in this area, calculating a standard deviation, to detect if there's a spread in test coverage, wherein a first quartile of histogram bars is qualified as areas where coverage is low. This may enable a systematic and accurate method for identifying low coverage areas in the feature space.

The method may automatically be executed e.g., in response to receiving a request to generate a new test case or on a periodic basis e.g., every month. Automatic test case generation may be performed without the need for any human intervention.

FIG. 1 illustrates a computer system 100 in accordance with an example of the present subject matter. The computer system 100 comprises an AI system 101 and one or more client systems 102a-n. The AI system 101 may be configured to communicate with each of the client systems 102a-n via one or more networks 103. For simplification of the description only one network is shown; however, the AI system 101 may connect to the client systems 102a-n via more than one network e.g., the AI system 101 may connect to each of the client systems 102a-n via a respective network. For example, the network 103 may include, but is not limited to, a cable network, an optical fiber network, a hybrid fiber coax network, a wireless network (e.g., a Wi-Fi and/or mobile telephone network), a satellite network, the Internet, an intranet, a local area network, any other suitable network, and/or any combination of these networks.

As shown, a user 105a-n may be associated with the client systems 102a-n respectively. The user 105a-n may include a viewer, owner, support technician etc. The user 105a-n may use a workstation (not shown) in order to interact or communicate with the client system 102a-n and the AI system 101.

The AI system 101 may be provided as a single server device or multiple server devices operating in a cloud computing configuration. The AI system 101 may be remote to the client systems 102a-n, accessible over the network 103. The AI system 101 may provide resources for training, suggesting, running and storing machine learning models using a ML engine 107. The AI system 101 may, for example, comprise a storage system 112 for storing an initial set of N test cases $TEST_1 \ldots TEST_N$, where $N \geq 1$. Each test case may be stored as a text file or XML file comprising the set of configuration parameters $Conf_1 \ldots Conf_L$ of the test case, where is the number of configuration parameters. Each configuration parameter may be a characteristic of input datasets of the ML models used by the ML engine 107 or a ML parameter of the ML models used by the ML engine 107. Storage system 112 may further store test codes $Code_1 \ldots Code_N$ for implementing the test cases $TEST_1 \ldots TEST_N$ respectively.

Figure 2:
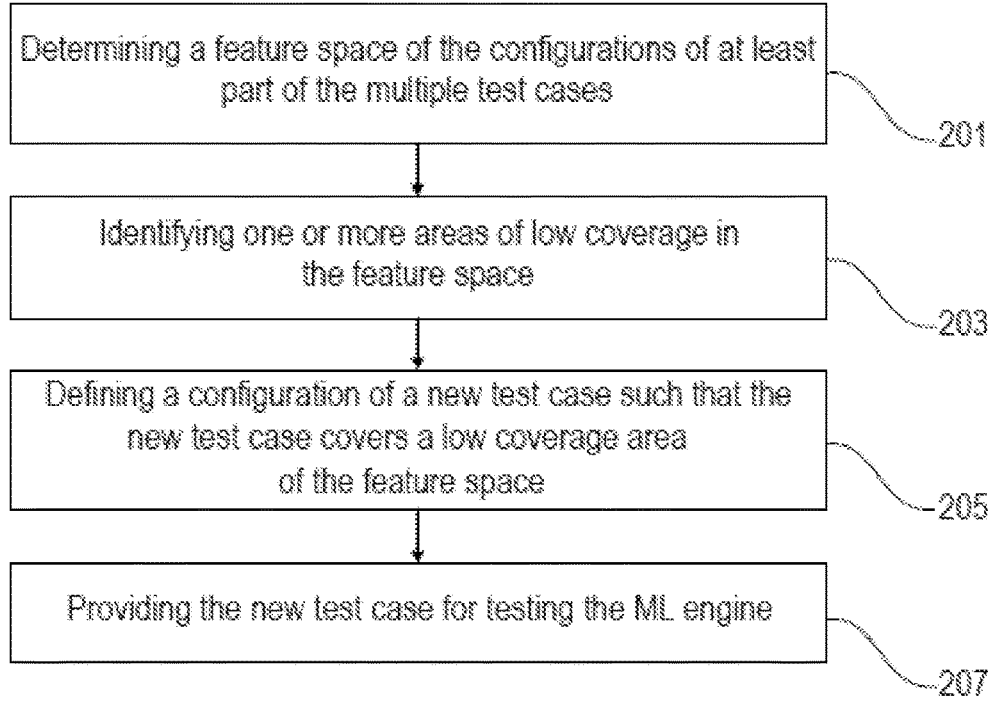
FIG. 2 is a flowchart of a method for generating tests of a machine learning engine in accordance with an example of the present subject matter.

FIG. 2 is a flowchart of a method for generating tests of a ML engine in accordance with an example of the present subject matter. For the purpose of explanation, the method described in FIG. 2 may be implemented in the system illustrated in FIG. 1, but is not limited to this implementation. The method of FIG. 2 may for example, be performed by the ML engine 107.

Figure 3:
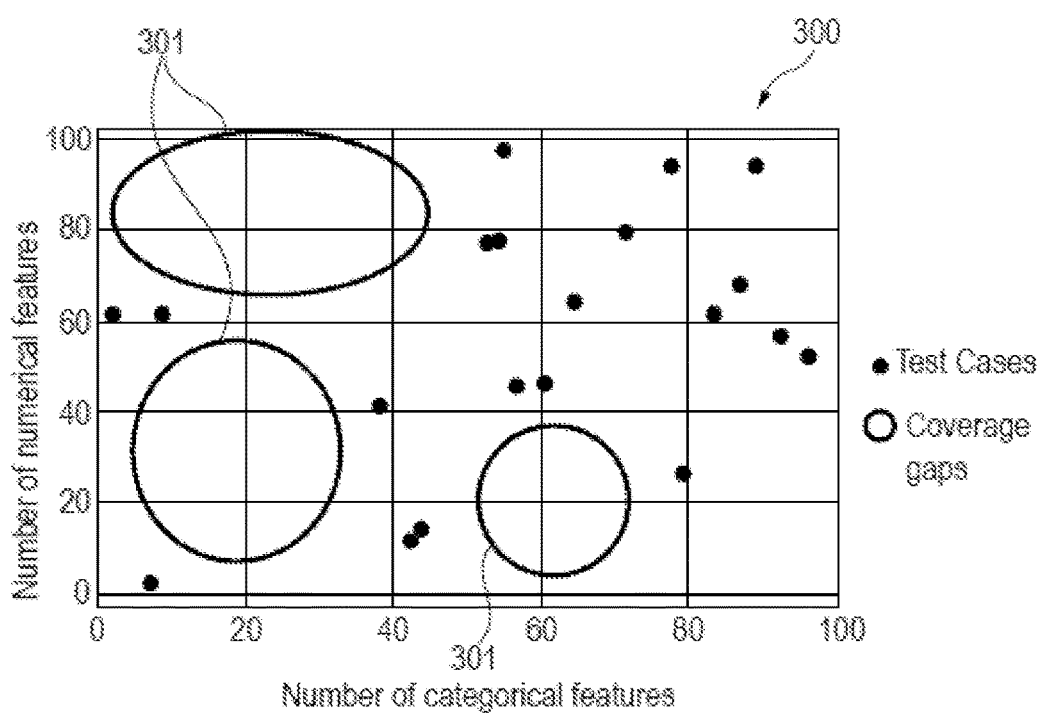
FIG. 3 is a plot representing a feature space in accordance with an example of the present subject matter.

A feature space of the sets of configuration parameters of at least part of the initial test cases $TEST_1 \ldots TEST_N$ may be determined in step 201. In one example, the at least part of the initial test cases $TEST_1 \ldots TEST_N$ may be all test cases $TEST_1 \ldots TEST_N$. Alternatively, the at least part of the initial test cases $TEST_1 \ldots TEST_N$ may be one or more selected test cases of the test cases $TEST_1 \ldots TEST_N$. The selected test cases may be randomly selected. Alternatively, the selected test cases may be test cases that when executed generate bugs. The feature space may for example, be a L-dimensional space whose dimension is equal to the number of configuration parameters of the test cases. The feature space may comprise a point representing each test case of the at least part of the test cases. Each point may be associated with a vector having respective values of the set of configuration parameters $Conf_1 \ldots Conf_L$. FIG. 3 shows an example two-dimensional feature space, L=2, for two configuration parameters which are the number of numerical features and the number of categorical features in the input datasets. The 2-dimensional feature space is provided as a correlation matrix 300 where each point represents a respective test case. As shown in FIG. 3, the feature space 300 comprises three low coverage areas 301. In this example, the threshold for defining the low coverage areas is one point.

One or more areas of low coverage may be identified in step 203 in the feature space. The low coverage area may be an area having a number of points smaller than a threshold e.g., the threshold may be a minimum number of points.

A configuration of a new test case may be defined in step 205 such that the new test case covers a selected low coverage area of the feature space. The configuration of the new test case may be defined by a vector of L values of the set of configuration parameters $Conf_1 \ldots Conf_L$ that belongs to the selected low coverage area. The selected low coverage area may be a randomly selected low coverage area of the feature space. Following the example of FIG. 3, the point that represents the new test case may be in one of the low coverage areas 301.

The new test case may be provided in step 207 for testing the ML engine 107. For example, the defined vector of the values of the set of configuration parameters $Conf_1 \ldots Conf_L$ may be used to create a test code from any test code of the test codes $Code_1 \ldots Code_N$. The created test code may for example, be executed in step 207 in order to test the ML engine 107.

In one example, the method steps 201 to 207 may automatically be executed on a periodic basis e.g., every week, or upon receiving a request e.g., from one of the client systems 102a-n.

In one example, steps 201 to 207 may be repeated until a predefined number of test cases is created or until no low coverage area remains in the feature space.

Figure 4:
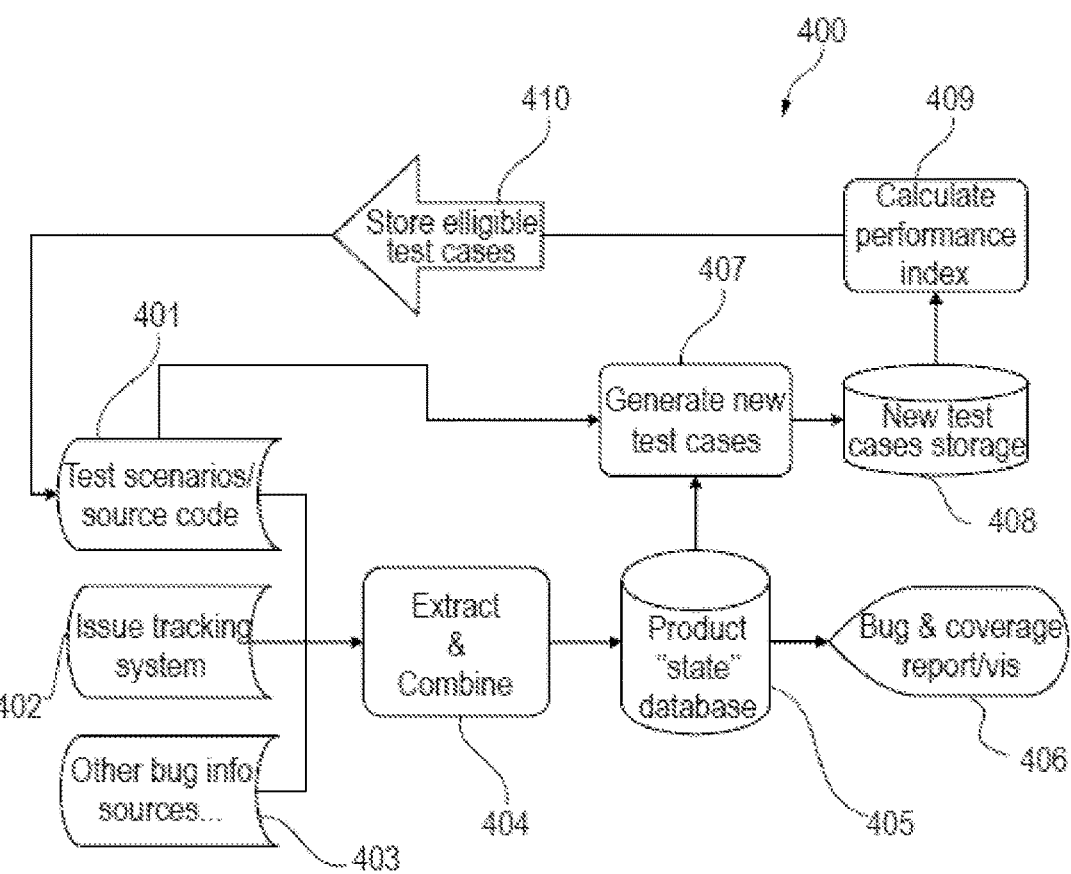
FIG. 4 depicts a computer system for generating test cases for an ML engine in accordance with an example of the present subject matter.

FIG. 4 depicts a computer system 400 for generating test cases for an ML engine in accordance with an example of the present subject matter.

The computer system 400 comprises source codes 401 for different test scenarios of the ML engine. The computer system 400 comprises an issue tracking system 402 and other bug information sources 403. The computer system 400 may comprise a data extraction component 404 that is configured to query the source codes 401, the issue tracking system 402 and other bug information sources 403 to generate issue documents that each describes an issue identified by the issue tracking system 402 for test cases 401. FIG. 5 shows an example issue document. The issue document may be provided as a JSON file that describes the dataset that caused the issues and the test cases that used the dataset. For example, the issue document may indicate a source type type-1 such as GITHUB. The issue document further describes the characteristics of the dataset. The generated documents may be stored in a database 405. The database 405 may be used to generate bug reports 406 or plots of feature spaces such as the plot of FIG. 3.

The computer system 400 may comprise a test case generation component 407 that is configured to generate new test cases using the source codes 401 and the stored issue documents in the database 405. The new test cases may temporarily be stored in the storage 408. The computer system 400 may comprise a performance component 409 that is configured to compute a performance index (e.g., as described with reference to FIG. 7) and to store (410) the eligible test cases with the existing test cases 401.

Figure 6:
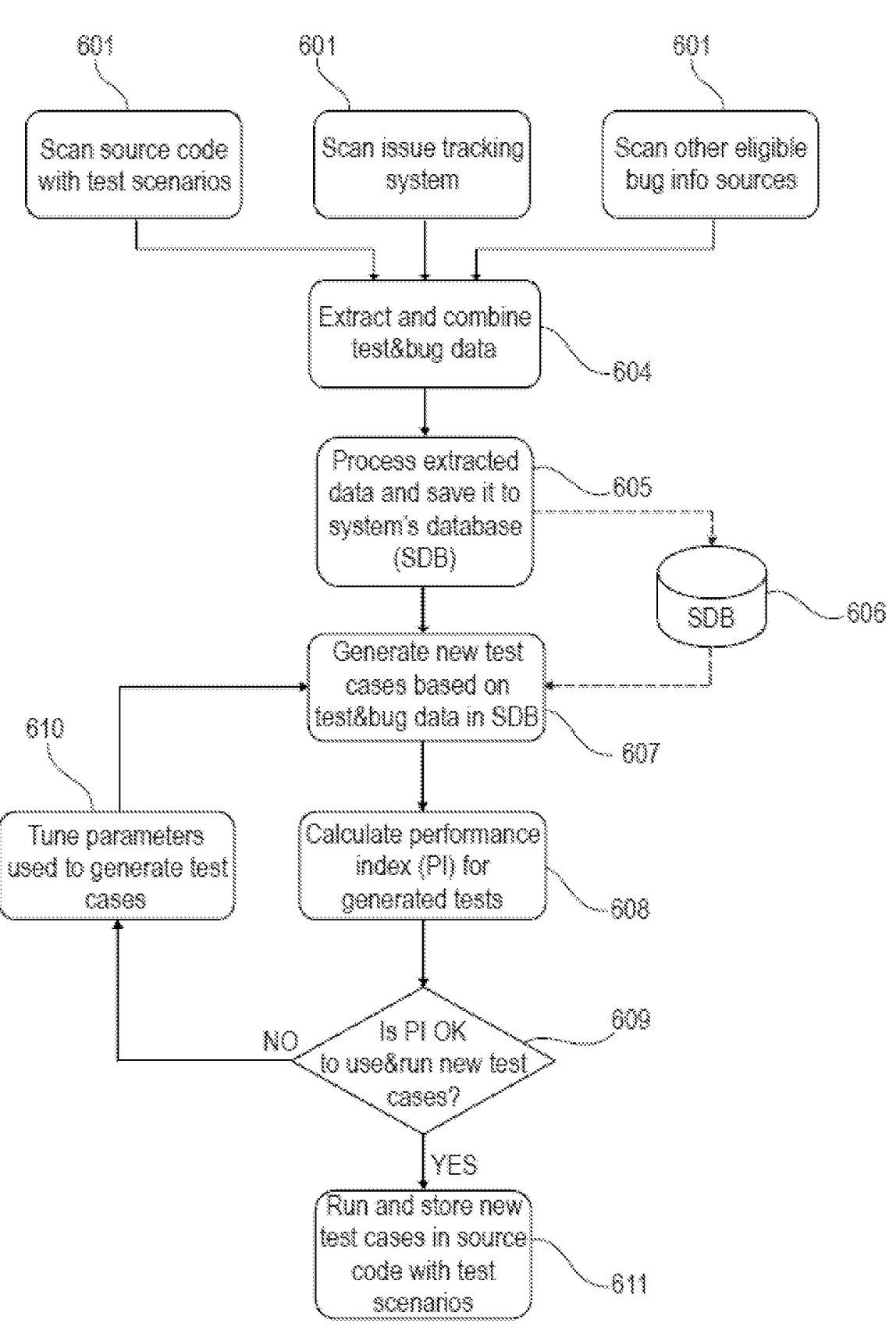
FIG. 6 is a flowchart of a method for generating test cases for an ML engine in accordance with an example of the present subject matter.

FIG. 6 is a flowchart of a method for generating test cases for an ML engine in accordance with an example of the present subject matter.

In step 601, a scan may be performed. The scan may be of source codes of test scenarios, of an issue tracking system and of other bug information sources. This scan may enable to extract and collect in step 604 test and bug data e.g., in form of documents such as the document shown in FIG. 5. The extracted data may be processed in step 605 and saved in a system database (SDB) 606. New test cases may be generated in step 607 using data of the SDB 606. A performance index may be computed in step 608 for each of the generated test cases. It may be determined in step 609 whether the new test case can be used based on the computed performance index. If the new test case cannot be used based on the performance index, the parameters used to generate the test case may be tuned in step 610 and the method goes back to step 607. If the new test case can be used based on the performance index, the new test case may be run and stored in step 611.

Figure 7:
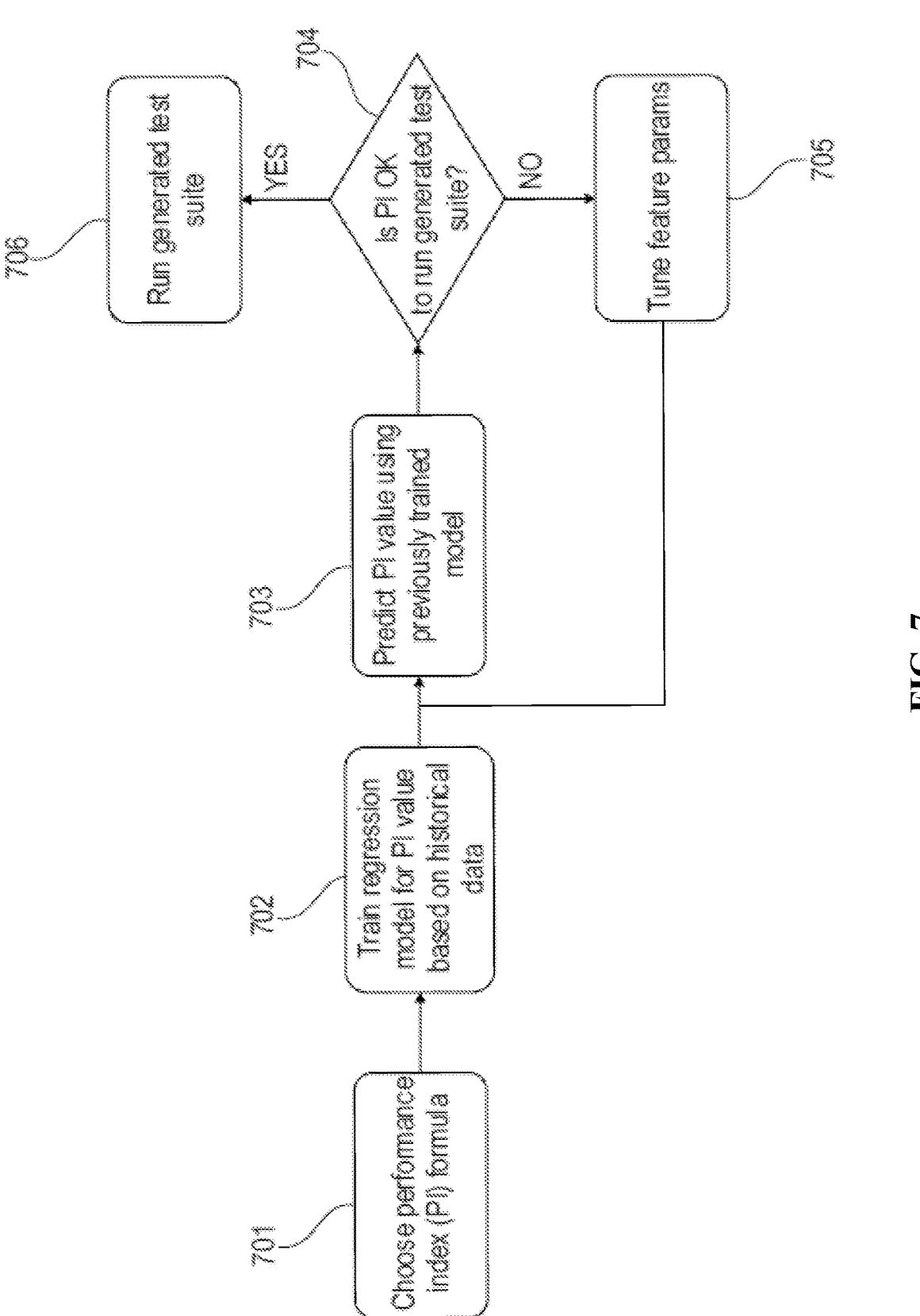
FIG. 7 is a flowchart of a method for computing a performance index for a test case for an ML engine in accordance with an example of the present subject matter.

FIG. 7 is a flowchart of a method for computing a performance index for a test case for an ML engine in accordance with an example of the present subject matter.

A performance index may be defined in step 701 as a weighted linear combination of execution time (cost), features coverage (test coverage), number of found bugs, and number of missed bugs. The performance index may for example, be defined as as a weighted sum as follows: performance_index=w1*execution_time+ w2*features_coverage+w3*found_bugs+w4*missed_bugs, where w1, w2, w3 and w4 are predefined weights, and execution_time, features_coverage, found_bugs, and missed_bugs are respectively the execution time of the new test case, features coverage of the feature space including the new test case, number of found bugs with test cases of the feature space, and number of missed bugs with test cases of the feature space. A regression model that fits the weighted sum may be found in step 702 using historical data.

The performance index may be predicted in step 703 by the regression model. Depending on the predicted performance index it may be decided in step 704 if it is acceptable to run the generated test suite or if a tune needs to be done. If a tune needs to be done, simulations approach may be used in step 705 to modify features parameters for generation of the test case and the performance index may be predicted again in step 703. Otherwise, the generated test suit may be run in step 706.

The present subject matter may comprise the following clauses.

Clause 1. A method for generating tests of a machine learning (ML) engine, the ML engine being configured for automatically finding a ML Model for performing a machine learning task based on an input dataset, wherein initial test cases are provided for testing the ML engine, wherein each test case has a specific configuration for testing the ML engine for performing a specific machine learning task, wherein the configuration is defined by a set of configuration parameters, the set of configuration parameters comprising at least part of a set of characteristics of the input dataset and/or at least part of a set of machine learning parameters, the method comprising: determining a feature space of the set of configuration parameters of at least part of the initial test cases, the feature space having a dimension equal to the number of configuration parameters; identifying one or more areas of low coverage in the feature space; defining a configuration of a new test case such that the new test case covers a low coverage area of the feature space; providing the new test case for testing a performance of the ML engine to find a ML model using an input dataset according to the configuration of the new test case.

Clause 2. The method of clause 1, the at least part of the test cases comprising any one of: all the provided tests cases; or selected one or more test cases of the provided test cases.

Clause 3. The method of any of the preceding clauses 1 to 2, further comprising: providing a bug tracking system that is configured to identify bugs when testing the ML engine using the initial test cases and collect bug data descriptive of the bugs; processing the bug data for identifying one or more test cases, referred to as bug test cases, wherein the at least part of the initial test cases used to determine the feature space are the bug test cases.

Clause 4. The method of clause 3, the bug data further indicating values of a problematic characteristic and/or a problematic machine learning parameter, wherein the configuration of the new test case is defined further using the problematic characteristic and/or the problematic machine learning parameter.

Clause 5. The method of clause 3 or 4, the bug data of each test case indicating any one of: —an erroneous value of a performance metric for the performed machine learning task of the test case, wherein the performance metric comprises: an accuracy for a classification task or a mean-squared error for a regression task; —an exceeded processing time limit of the testing of the ML engine using the test case; —different results using multiple runs of the same input dataset of the test case.

Clause 6. The method of any of the preceding clauses 1 to 5, further comprising defining further new test cases such that the feature space has no low coverage areas.

Clause 7. The method of any of the preceding clauses 1 to 6, the dataset comprising records, wherein each record of the records comprises values of features, the characteristics of the dataset comprise at least one of: the fraction of categorical features in the dataset, the number of features in the dataset, the number of records in the dataset, or the proportion of records with at least one missing feature.

Clause 8. The method of any of the preceding clauses 1 to 7, the set of configuration parameters comprising a subset of characteristics of the input datasets of the at least part of test cases, wherein the feature space is defined as a correlation matrix of the subset of characteristics.

Clause 9. The method of clause 8, the feature space being a 2-dimensional space that is defined as a correlation matrix of the number of categorical features and the number of numerical features in each dataset of the at least part of test cases.

Clause 10. The method of any of the preceding clauses 1 to 9, wherein defining the test case comprises: using the defined configuration and a code of one of the provided test cases to generate a code for the new test case.

Clause 11. The method of any of the preceding clauses 1 to 10, wherein the testing of the performance of the ML engine comprises computing a performance index of the new test case, wherein the new test case is provided in case the performance index fulfils a predefined performance condition, the method further comprising saving the new test case with the initial test cases in case the performance index fulfils the predefined performance condition.

Clause 12. The method of clause 11, wherein the performance index is determined using at least one of: execution time of the new test case, features coverage of the feature space including the new test case, number of found bugs with test cases of the feature space, or number of missed bugs with test cases of the feature space.

Clause 13. The method of any of the preceding clauses 1 to 12, wherein determining the feature space comprises: projecting all data to a k-dimensional feature space, where k is the number of configuration parameters; dividing the space into a number of regions; constructing a histogram, where each region is represented by a histogram bar with height equal to number of datapoints in normalized feature space in this region; calculating a standard deviation, to detect if there's a spread in test coverage, wherein a first quartile of histogram bars is qualified as regions where coverage is low.

Clause 14. The method of any of the preceding clauses 1 to 13, being automatically performed.

Computing environment 800 contains an example of an environment for the execution of at least some of the computer code involved in performing the inventive methods, such as a ML engine test case generation code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 8:
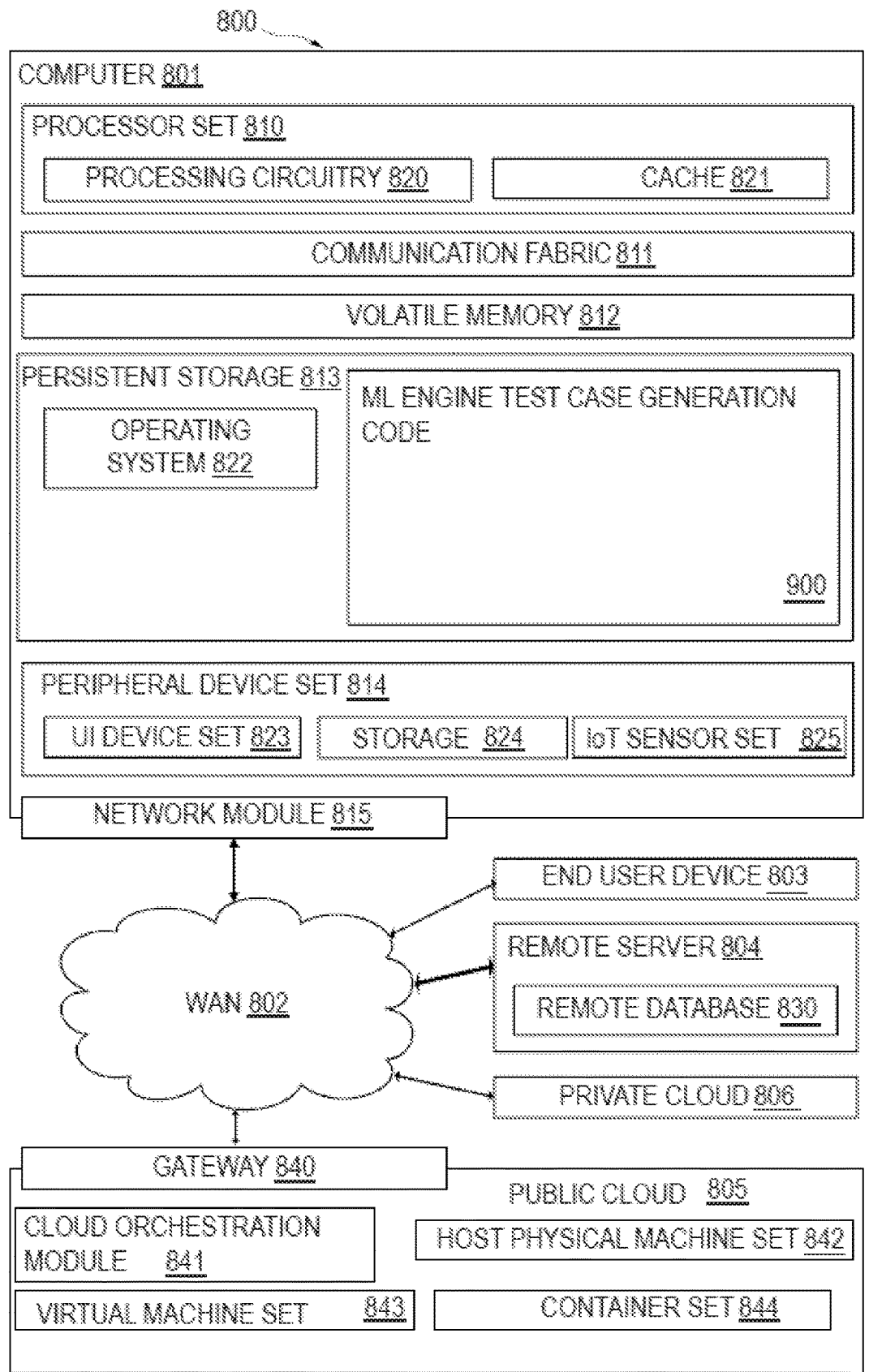
FIG. 8 is a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
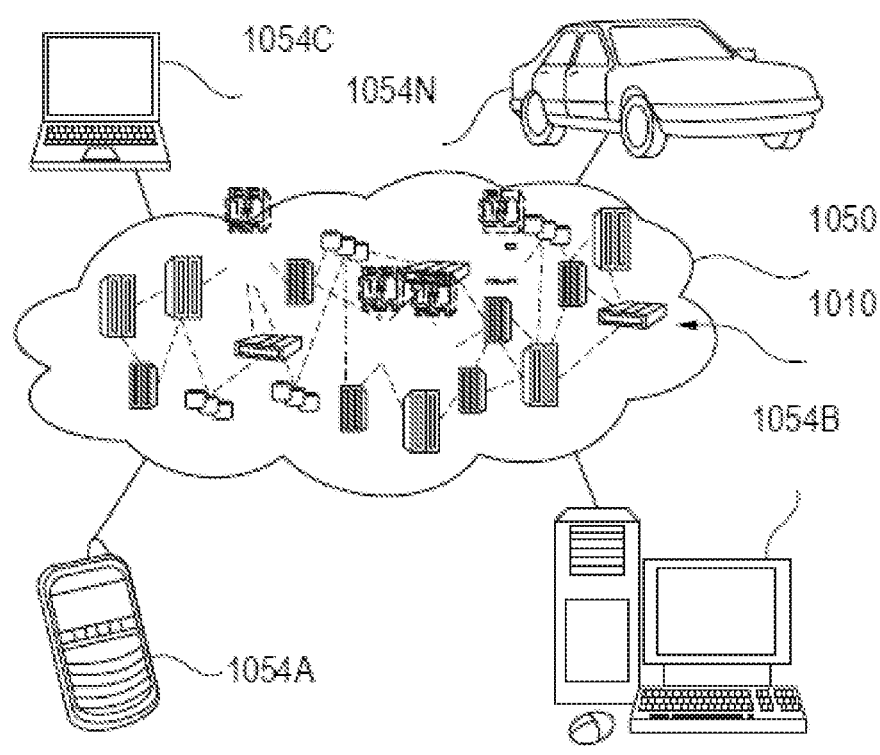
FIG. 9 depicts a cloud computing environment according to an embodiment of the present invention.

Referring now to FIG. 9, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 9 are intended to be illustrative only and that computing nodes 1010 and cloud computing environment 1050 can communicate with any type of computerized device over any type of network and/or network addressable connection (e.g., using a web browser).

Figure 10:
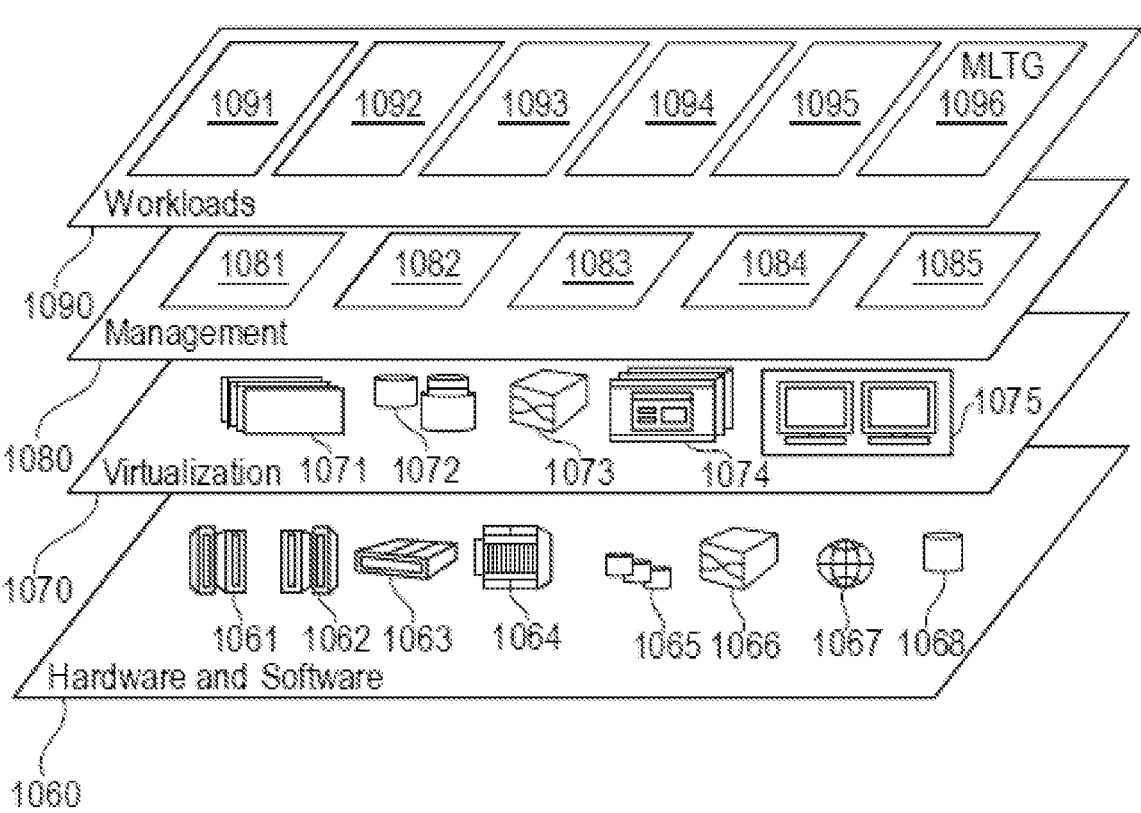
FIG. 10 depicts abstraction model layers according to an embodiment of the present invention.

Referring now to FIG. 10, a set of functional abstraction layers provided by cloud computing environment 1050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a ML engine test case generation (MLTG) 1096 in accordance with the present subject matter e.g., as described with reference to FIG. 2, 4, 6 or 7.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A computer-implemented method, the method comprising:

generating tests of a machine learning (ML) engine configured for automatically finding a ML Model for performing a machine learning task based on an input dataset, wherein initial test cases are provided for testing the ML engine and each test case has a specific configuration for testing the ML engine regarding performing a specific machine learning task, wherein each configuration is defined by a set of configuration parameters comprising at least part of a set of characteristics of the input dataset and at least part of a set of machine learning parameters, the tests generated by:

determining a feature space of the set of configuration parameters of at least part of the initial test cases, the feature space having a dimension equal to a number of configuration parameters, wherein the feature space is based on bug cases;

identifying one or more areas of low coverage in the feature space;

defining a configuration of a new test case such that the new test case covers a low coverage area of the feature space; and providing the new test case for testing a performance of the ML engine to find a ML model using an input dataset according to the configuration of the new test case.

2. The computer-implemented method of claim 1, the at least part of the test cases comprising any one of:

all the provided tests cases; or selected one or more test cases of the provided test cases.

3. The computer-implemented method of claim 1, the method further comprising:

providing a bug tracking system that is configured to identify bugs when testing the ML engine using the initial test cases and collect bug data descriptive of the bugs; and processing the bug data for identifying one or more test cases, referred to as bug test cases, wherein the at least part of the initial test cases used to determine the feature space are the bug test cases.

4. The computer-implemented method of claim 3, wherein:

the bug data further indicating values of a problematic characteristic and/or a problematic machine learning parameter; and the configuration of the new test case is defined further using the problematic characteristic and/or the problematic machine learning parameter.

5. The computer-implemented method of claim 3, wherein the bug data of each test case indicating at least one of the group comprises:

an erroneous value of a performance metric for the performed machine learning task of the test case, wherein the performance metric comprises: an accuracy for a classification task or a mean-squared error for a regression task;

an exceeded processing time limit of the testing of the ML engine using the test case; or different results using multiple runs of the input dataset of the test case.

6. The computer-implemented method of claim 1, further comprising defining further new test cases such that the feature space has no low coverage areas.

7. The computer-implemented method of claim 1, the input dataset comprising records, wherein each record of the records comprises values of features, the characteristics of the dataset comprise at least one of:

a fraction of categorical features in the dataset, the number of features in the dataset, the number of records in the dataset, or a proportion of records with at least one missing feature.

8. The computer-implemented method of claim 1, the set of configuration parameters comprising a subset of characteristics of the input datasets of the at least part of test cases, wherein the feature space is defined as a correlation matrix of the subset of characteristics.

9. The computer-implemented method of claim 8, the feature space being a 2-dimensional space that is defined as a correlation matrix of a number of categorical features and a number of numerical features in each dataset of the at least part of test cases.

10. The computer-implemented method of claim 1, wherein defining the test case comprises: using the defined configuration and a code of one of the provided test cases to generate a code for the new test case.

11. The computer-implemented method of claim 1, wherein the testing of the performance of the ML engine comprises computing a performance index of the new test case, wherein the new test case is provided in case the performance index fulfils a predefined performance condition, the method further comprising saving the new test case with the initial test cases in case the performance index fulfils the predefined performance condition.

12. The computer-implemented method of claim 11, wherein the performance index is determined using at least one of: execution time of the new test case, features coverage of the feature space including the new test case, number of found bugs with test cases of the feature space, or number of missed bugs with test cases of the feature space.

13. The computer-implemented method of claim 1, wherein determining the feature space comprises:

projecting all data to a k-dimensional feature space, where k is the number of configuration parameters;

dividing the space into a number of regions;

constructing a histogram, where each region is represented by a histogram bar with height equal to number of datapoints in normalized feature space in this region; and calculating a standard deviation, to detect if there's a spread in test coverage, wherein a first quartile of histogram bars is qualified as regions where coverage is low.

14. A system comprising:

a processor; and a memory in communication with the processor, the memory containing instructions that, when executed by the processor, cause the processor to:

generate tests of a machine learning (ML) engine configured for automatically finding a ML Model for performing a machine learning task based on an input dataset, wherein initial test cases are provided for testing the ML engine and each test case has a specific configuration for testing the ML engine regarding performing a specific machine learning task, wherein each configuration is defined by a set of configuration parameters comprising at least part of a set of characteristics of the input dataset and/or at least part of a set of machine learning parameters, the tests generated by:

determine a feature space of the set of configuration parameters of at least part of the initial test cases, the feature space having a dimension equal to a number of configuration parameters, wherein the feature space is based on bug cases;

identify one or more areas of low coverage in the feature space;

define a configuration of a new test case such that the new test case covers a low coverage area of the feature space; and provide the new test case for testing a performance of the ML engine to find a ML model using an input dataset according to the configuration of the new test case.

15. The system of claim 14, the at least part of the test cases comprising any one of:

all the provided tests cases; or selected one or more test cases of the provided test cases.

16. The system of claim 14, the memory containing additional instructions that, when executed by the processor, cause the processor to:

provide a bug tracking system that is configured to identify bugs when testing the ML engine using the initial test cases and collect bug data descriptive of the bugs; and process the bug data for identifying one or more test cases, referred to as bug test cases, wherein the at least part of the initial test cases used to determine the feature space are the bug test cases.

17. The system of claim 16, wherein:

the bug data further indicating values of a problematic characteristic and/or a problematic machine learning parameter; and the configuration of the new test case is defined further using the problematic characteristic and/or the problematic machine learning parameter.

18. The system of claim 17, wherein the bug data of each test case indicating at least one of the group comprises:

an erroneous value of a performance metric for the performed machine learning task of the test case, wherein the performance metric comprises: an accuracy for a classification task or a mean-squared error for a regression task;

an exceeded processing time limit of the testing of the ML engine using the test case; or different results using multiple runs of the input dataset of the test case.

19. The system of claim 14, the memory containing additional instructions that, when executed by the processor, cause the processor to define further new test cases such that the feature space has no low coverage areas.

20. A computer program product comprising a computer-readable storage medium having computer-readable program code embodied therewith, the computer-readable program code configured to cause a computer to:

generate tests of a machine learning (ML) engine configured for automatically finding a ML Model for performing a machine learning task based on an input dataset, wherein initial test cases are provided for testing the ML engine and each test case has a specific configuration for testing the ML engine regarding performing a specific machine learning task, wherein each configuration is defined by a set of configuration parameters comprising at least part of a set of characteristics of the input dataset and/or at least part of a set of machine learning parameters, the tests generated by:

determine a feature space of the set of configuration parameters of at least part of the initial test cases, the feature space having a dimension equal to a number of configuration parameters, wherein determining the feature space comprises:

projecting all data to a k-dimensional feature space, where k is the number of configuration parameters;

dividing the space into a number of regions;

constructing a histogram, where each region is represented by a histogram bar with height equal to number of datapoints in normalized feature space in this region; and calculating a standard deviation, to detect if there's a spread in test coverage, wherein a first quartile of histogram bars is qualified as regions where coverage is low;

identify one or more areas of low coverage in the feature space;

define a configuration of a new test case such that the new test case covers a low coverage area of the feature space; and provide the new test case for testing a performance of the ML engine to find a ML model using an input dataset according to the configuration of the new test case.

* * * * *